United States Patent [19]

Altmann et al.

[11] Patent Number: 5,065,878
[45] Date of Patent: Nov. 19, 1991

[54] HOUSING IN PARTICULAR FOR ACCOMMODATING ELECTRICAL EQUIPMENT, WITH INTEGRABLE HINGES

[76] Inventors: Joachim Altmann, Haendelstrasse 32, 6453 Seligenstadt; Friedhelm Rose, Mindenerweg 24 B, 4952 Porta Westfalica; Roman Schwartz, Heimelstrasse 18 B, 6601 Sbr. Ensheim; Horst Schmitt, 3 rue de la Gare, F 67260 Wolfskirchen, all of France

[21] Appl. No.: 531,078
[22] Filed: May 31, 1990

[30] Foreign Application Priority Data

May 31, 1989 [FR] France ............................... 89 07159

[51] Int. Cl.⁵ ............................................... H02G 3/00
[52] U.S. Cl. ..................................... 220/3.8; 220/334
[58] Field of Search .................... 220/3.3, 3.8, 4.02, 220/4.22, 327, 328, 334, 339

[56] References Cited

U.S. PATENT DOCUMENTS

| | | | |
|---|---|---|---|
| 2,063,569 | 12/1936 | Walker | 220/3.8 X |
| 2,458,987 | 1/1949 | Fruth et al. | 220/3.8 X |
| 3,029,964 | 4/1962 | Hudson et al. | 220/3.8 X |
| 3,318,476 | 5/1967 | Clark | 220/3.8 X |
| 3,592,354 | 7/1971 | Nielsen | 220/334 |
| 4,059,199 | 11/1977 | Quaney | 220/3.8 |
| 4,620,061 | 10/1986 | Appleton | 220/3.8 X |
| 4,632,269 | 12/1986 | Rose | 220/3.3 X |

FOREIGN PATENT DOCUMENTS 2115614  2/1982  United Kingdom .
2151859  7/1985  United Kingdom .

Primary Examiner—Steven M. Pollard
Attorney, Agent, or Firm—Morrison Law Firm

[57] ABSTRACT

The invention relates to a housing in particular for accommodating electrical equipment, with integrable hinges.

The body of the housing may be joined to the cover by hinges which may be mounted as required in reserved zones formed as a hollow outside a rabbet in the cover and a cooperating surrounding wall of the body, limiting the interior space of the housing.

The invention permits the articulation of the cover on the body of the housing and also the tightening of the body on the cover by means of the four screws provided in the four corners of the housing for this purpose.

3 Claims, 4 Drawing Sheets

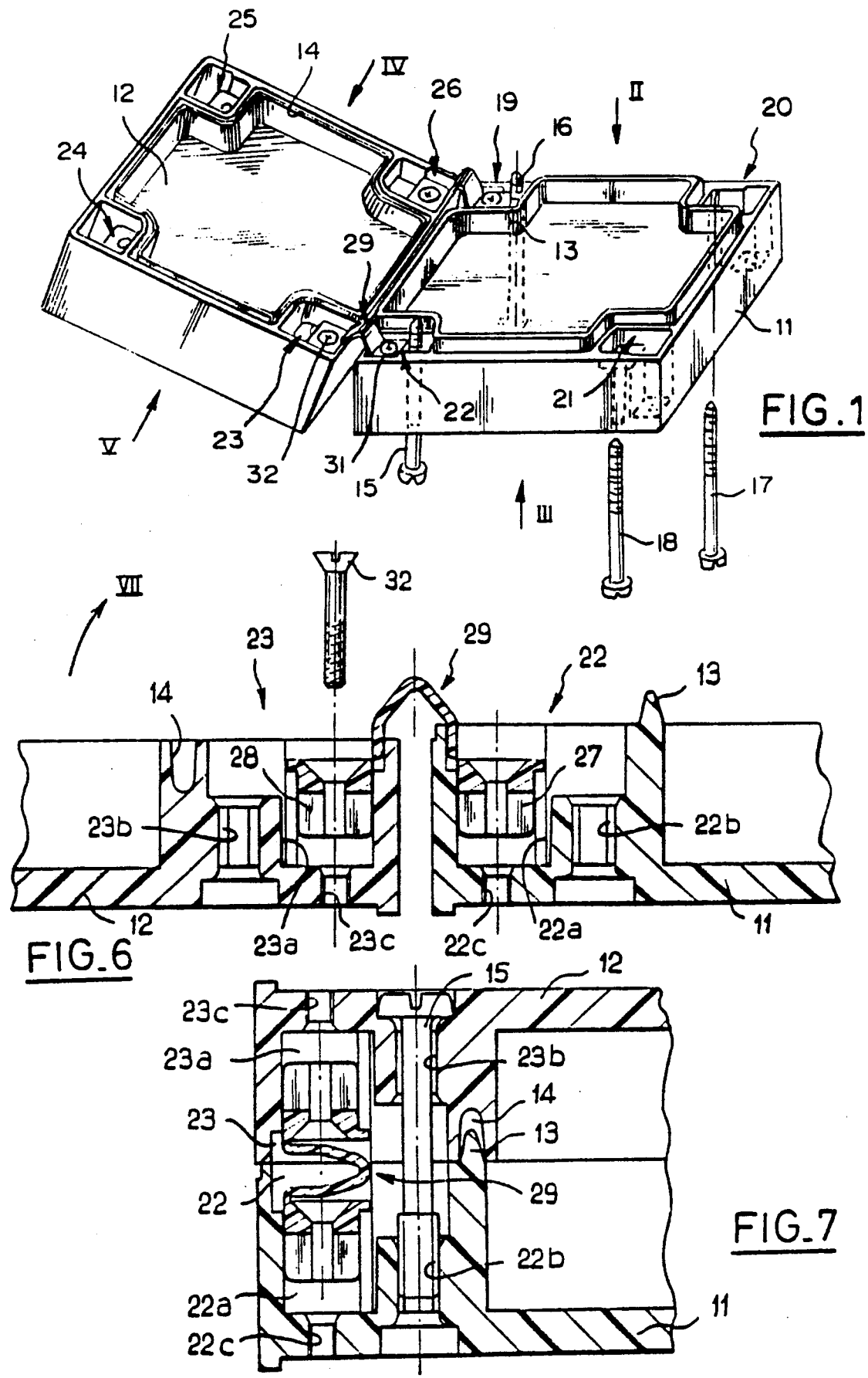

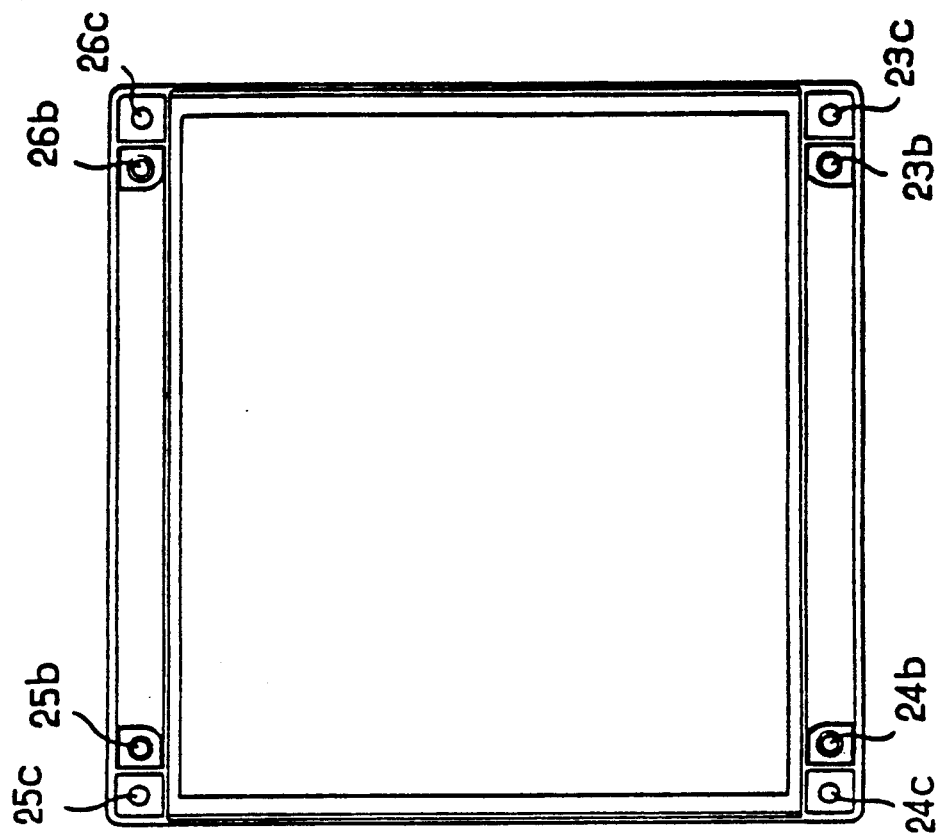
FIG_5
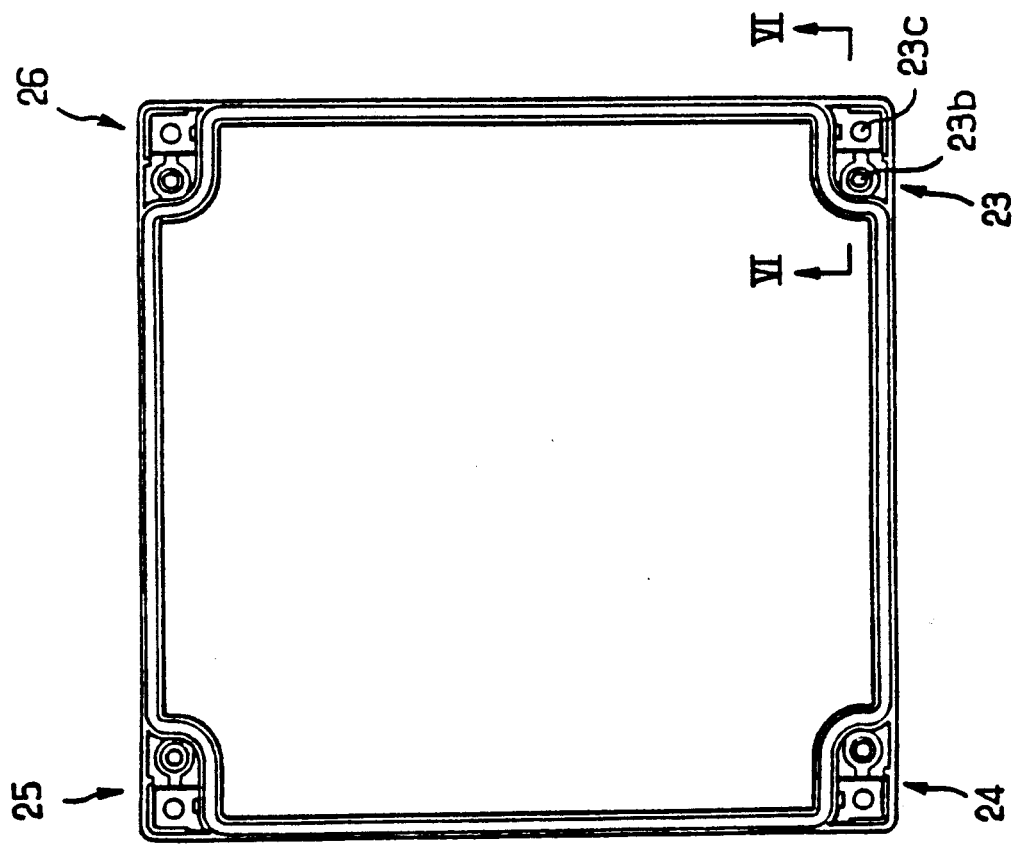
FIG_4

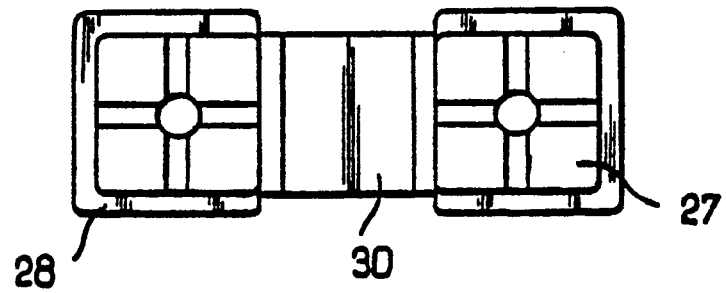
FIG_9
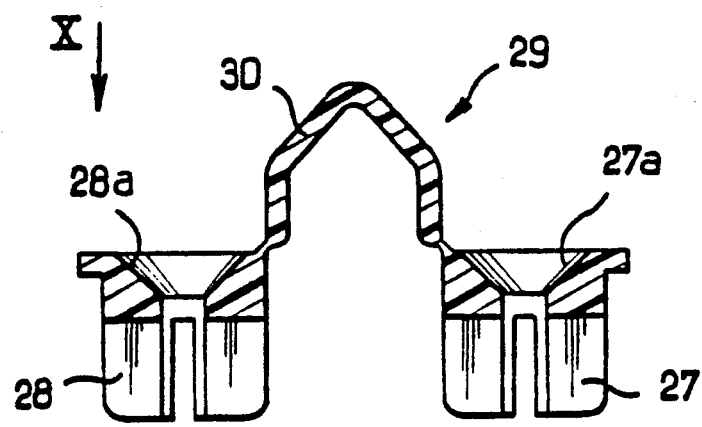
FIG_8
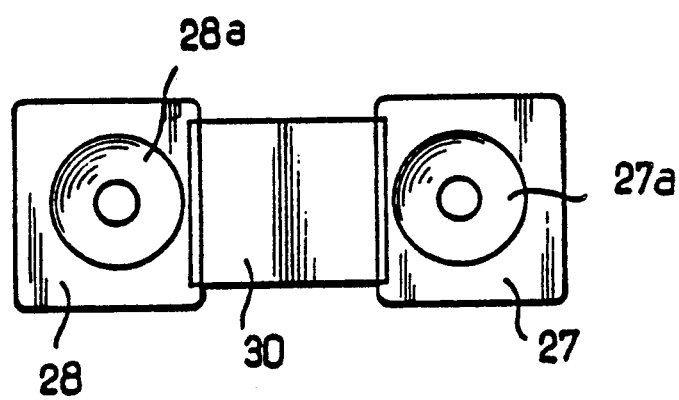
FIG_10

HOUSING IN PARTICULAR FOR ACCOMMODATING ELECTRICAL EQUIPMENT, WITH INTEGRABLE HINGES

The invention relates to improvements to housings for accommodating in particular electrical or electronic equipment. The invention relates more particularly to housings of general parallelepipedic rectangular shape of the type comprising a body onto which a cover is fitted in a sealed manner.

In order to achieve a perfect seal upon closure, it is known to provide in the four corners of the cover screws which are screwed into the four corners of the body opposite, the screws passing through parts of the housing outside the internal space of the housing.

Although such a method of closure and fastening is satisfactory in terms of sealing, it is not very practical for the user if the latter wishes to have access to the equipment contained in the housing In fact, the solution thus advocated necessitates, in order to open the housing, unscrewing the four screws and removing the cover entirely, which is impractical.

Under these conditions, some users require the cover to be fastened on one side of the body of the housing by a system of hinges which are fitted in place of the corresponding fastening screws, the tight closure by application of the cover onto the body of the housing being obtained only by screwing down, in cooperation with these hinges, the two screws provided on the opposite closing side of the housing. This solution is limited as regards sealing standards. Moreover, it forces the user, or those manufacturing the housing at his request, to provide locating points in the body and the cover for fastening the hinges, these operations being relatively expensive and difficult.

The object of the invention is to solve these various difficulties while enabling a perfect sealing closure to be retained by means of four screws provided in the four corners of the housing and while at the same time enabling the user to fit hinges very easily himself onto any one of the lateral or longitudinal sides of the housing in order to obtain additionally a device with a cover which is articulated on the body of the housing if he so desires.

To this end, the housing according to the invention of the general type described above is characterized in that the body and the cover of the housing have, at each of their four corners towards their interior face, hollow reserved zones of small area which are formed outside a rabbet in the cover and a cooperating projecting surrounding wall of the body of the housing, limiting its interior space, the said zones each being formed respectively with a hollow receptacle capable of receiving, fastened therein and set back within the general space of the housing, the foot of one of the hinges which is mounted astride the desired side of the body and of the cover.

The invention also relates to a hinge for the mutual articulation of a cover on a housing body of the general type described above, the said hinge being characterized in that it comprises two feet in the form of studs joined by a strip in the general form of a U, a V or a U with V-shaped base, the whole being moulded in a single piece of flexible plastic of suitable quality.

The invention and its implementation will become clearer with the aid of the description below, with reference to the accompanying drawings in which:

FIG. 1 is a general perspective view of a housing designed to receive integrable hinges according to the invention, the cover being shown in the open position and articulated on the body of the housing;

FIG. 4 is a plan view of the housing cover viewed from inside in the direction of the arrow IV of FIG. 1;

FIG. 5 is a plan view of the cover viewed from outside in the direction of the arrow V of FIG. 1;

FIG. 6 is a detail cutaway sectional view taken in the region of the section planes marked VI—VI of FIGS. 2 and 4 of the body of the housing and of the cover of the housing in the assembled position, in the region of one hinge, the cover being assumed to be articulated in the fully open position at 180° relative to the body of the housing;

FIG. 7 is a view similar to that of FIG. 6 but showing the respective positions of the members when the cover has been rotated through 180° over the body of the housing in the direction of the arrow VII of FIG. VI, it being assumed additionally that the screws for tightening the housing with a sealed closure are in place;

FIG. 8 is a view of a hinge to a larger scale and in median section;

FIGS. 9 and 10 are views respectively from below and from above the hinge of FIG. 8 in the direction of the arrows IX and X respectively of FIG. 8.

Figure 3:
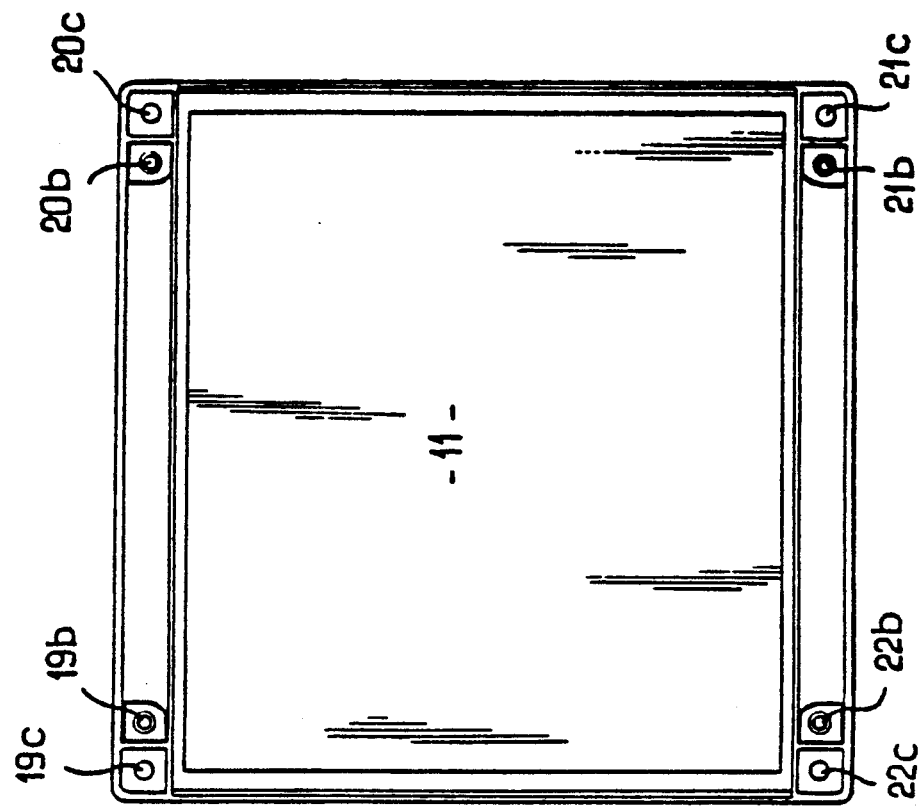
FIG. 3 is a plan view of the same housing body from the other side in the direction of the arrow III of FIG. 1.
Figure 2:
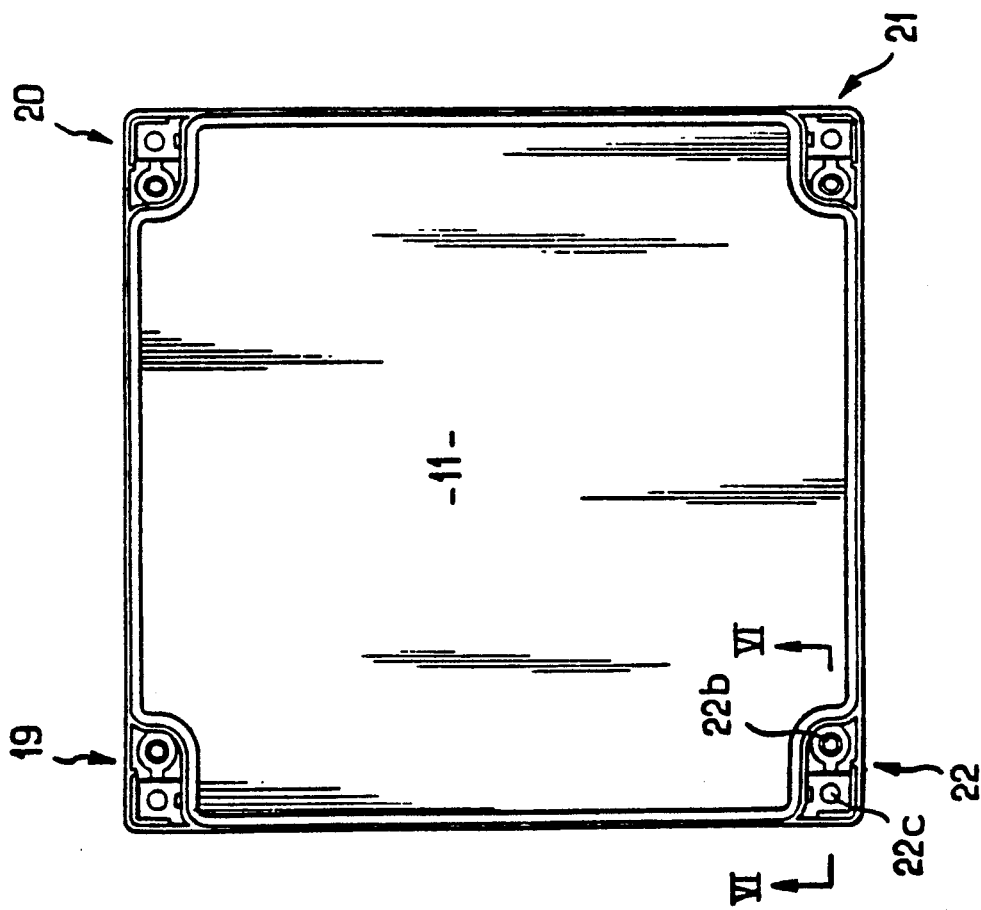
FIG. 2 is a front view of the body of the housing viewed from inside in the direction of the arrow II of FIG. 1.

Referring to the drawings and first of all more particularly to the general FIG. 1, the housing is composed, in a conventional manner, of a housing body 11 and a housing cover 12 which cooperate so as to enclose between them in a sealed manner a protective space in which electrical, electronic and other equipment will be accommodated. In the example illustrated, the sealing of the protective space is obtained in a conventional manner by mating a raised surrounding wall 13 formed towards the outer periphery of the body 11, which is engaged in a rabbet or groove 14 of corresponding shape arranged in the cover 12 in such a way that the wall 13 penetrates sealingly into the rabbet 14 when the cover is applied onto the body of the housing upon closure.

In a known manner, the sealed closure of the housing may be obtained in particular by using four tightening screws 15, 16, 17 and 18 provided in the four corners of the housing, the said screws passing through the body and the cover and permitting suitable tightening of the two parts of the housing one onto the other, as can be seen more clearly in FIG. 7 in which the screw 15 is shown tightly fastened, joining the cover 12 to the base 11 and holding the wall 13 in engagement in the rabbet 14.

Of course, the screws in question are placed outside the sealing periphery for closure of the housing, as can be seen clearly in the drawings and as is also conventional.

As indicated above, this solution is, however, not entirely practical as regards the user who may wish to facilitate the opening of the housing by providing an articulation of one side of the cover on the body.

According to the prior art, in such a case two of the screws for fastening the cover and the housing, for example screws 15 and 16, are then eliminated and on the sides facing the housing of the cover there are mounted two hinges, each consisting generally of a simple plane strip straddling the housing and the cover, this necessitating further machining of the housing and the cover in order to allow for the passage of the strip (which is visible outside the housing) and the correct fastening of the articulation strip on the cover and on the body.

Besides the difficulties of carrying out these further machining operations correctly and the cost which that involves, the solution is not entirely satisfactory, the sealing being ensured in the region of the articulation not as well as by appropriate tightening of screws, the solution additionally being unaesthetic.

According to the invention, the solution consists in providing at each of the four corners of the body 11 and the cover 12 of the housing, reserved zones formed as a hollow of small area outside the cooperating rabbet and the wall of the cover and of the body of the housing, the said zones each being formed respectively with a hollow receptacle capable of receiving, fastened therein and set back within the general space of the housing, the foot of a hinge which is fastened astride the desired side of the body and the cover. More precisely, these zones have been indicated respectively by reference numerals 19, 20, 21, 22 for the body 11 and 23, 24, 25, 26 for the cover 12.

As can be seen clearly in the figures and particularly clearly in FIG. 6, each zone thus reserved, such as 22, 23, comprises a hollow receptacle 22a, 23a respectively, which is capable of receiving, as will be described in greater detail below, the foot, such as indicated by 27, 28, of a hinge 29 which is fastened astride the desired side of the body 11 and the cover 12.

In the same FIG. 6, it can also be seen that in these reserved zones there are also formed orifices 22b, 23b respectively, which are offset towards the centre of the housing relative to the orifices 22a, 23a, for the passage and the fastening of the screw, such as 15, for fastening and sealingly tightening the cover on the housing in the closed position, as can be seen more clearly in FIG. 7.

FIGS. 8, 9 and 10 show in greater detail the composition of the hinges including their two feet 27, 28 in the form of generally cubic studs which are joined by an elastically deformable strip 30 of cross-section in the general form of a U with a V-shaped base.

It can also be seen in these figures that each stud, such as 27, 28, has on its top a chamfer, such as 27a, 28a, for accommodating the head of fastening screws, such as 31, 32 (FIGS. 1 and 6). Each foot, such as 27, 28, is advantageously split, for example in the form of a cross (FIG. 9), for a better fit in its receiving receptacle, such as 22a, 23a.

It can be seen that with such a design, when the hinges are integrated in the housing and the latter is tightened by means of its fastening screws, such as 15, 16, 17, 18, the hinges, such as the hinge 29 (FIG. 7), are entirely retracted inside the outer space of the housing and precisely in the spaces of the abovementioned hollow reserved zones, such as 22, 23.

It can also be seen that the hinges may be used or not used in accordance with the user's wishes and that they may be mounted on any longitudinal or lateral side of the housing depending on whether it is desired that the housing opens from left to right or from right to left or alternatively downwards or upwards.

In FIGS. 3 and 5, the passage orifices formed in the body have been indicated for greater clarity by reference numerals 19b, 20b, 21b, 22b and in the cover by reference numerals 23b, 24b, 25b, 26b for the passage and the tightening of the sealing screws 15 to 18, and the passage orifices formed in the body and in the cover for the fastening of the screws, such as 31, 32, of the hinge feet have been indicated at 19c, 20c, 21c, 22c, on the one hand and at 23c, 24c, 25c, 26c, on the other hand.

We claim:

1. A housing comprising:
   a body including a generally rectangular base and four walls joined to said base and meeting at four corners;
   a cover including a generally rectangular base and four walls joined to said base and meeting at four corners;
   first wall means in said body defining, with said body walls, a hollow receptacle in each of said body corners;
   second wall means is said cover defining, with said cover walls, a hollow receptacle in each of said cover corners;
   an outwardly projecting lip, formed on said first wall means and said body walls, enclosing said body exclusive of said hollow receptacles therein;
   means defining a rabbet, formed on said second wall means and said cover walls, enclosing said cover exclusive of said hollow receptacles therein;
   said lip being configured to be sealingly received in said rabbet;
   said hollow receptacles of said body and said cover each being adapted to receive a mechanical fastener for fastening said cover to said body;
   at least two mechanical fasteners adapted to fasten said cover to said body; and
   a pair of removable hinge members for hingedly connecting said cover to said body, each of said hinge members comprising a pair of feet and a flexible strap member connecting said feet, said feet being adapted for insertion into said hollow receptacles of said body and said cover.

2. The housing according to claim 1, further including means for releasably securing said hinge member feet in said hollow receptacles of said body and said cover.

3. The housing according to claim 1 wherein said mechanical fasteners consist of screws each of which is screwed into walls in said hollow receptacles through said base of the body and the cover, in a position of said housing where said lip is received in said rabbet.

* * * * *